(12) United States Patent
Horiuchi et al.

(10) Patent No.: US 11,832,604 B2
(45) Date of Patent: Dec. 5, 2023

(54) HUNTING AND FISHING HARPOON MACHETE

(71) Applicant: HORIUCHI MFG. CO., LTD., Koga (JP)

(72) Inventors: Kengo Horiuchi, Koga (JP); Kounosuke Horiuchi, Koga (JP); Ryohei Wano, Koga (JP)

(73) Assignee: HORIUCHI MFG. CO., LTD., Ibaraki (JP)

( * ) Notice: Subject to any disclaimer, the term of this patent is extended or adjusted under 35 U.S.C. 154(b) by 0 days.

(21) Appl. No.: 17/857,267

(22) Filed: Jul. 5, 2022

(65) Prior Publication Data

US 2022/0338458 A1    Oct. 27, 2022

Related U.S. Application Data

(62) Division of application No. 16/730,354, filed on Dec. 30, 2019, now abandoned.

(30) Foreign Application Priority Data

Dec. 31, 2018 (JP) ................................. 2018-248856

(51) Int. Cl.
*A01K 97/14* (2006.01)
*A01K 81/04* (2006.01)
(Continued)

(52) U.S. Cl.
CPC .............. *A01K 97/14* (2013.01); *A01K 81/04* (2013.01); *A01M 27/00* (2013.01); *A01M 31/00* (2013.01)

(58) Field of Classification Search
CPC ........ A01K 97/14; A01K 81/04; A01M 81/04
See application file for complete search history.

(56) References Cited

U.S. PATENT DOCUMENTS 17,297 A    5/1857 Reuthe
35,476 A * 6/1862 Roys ...................... A01K 97/14
                                                         43/6.5
(Continued)

FOREIGN PATENT DOCUMENTS

CN    201541605 U    8/2010
FR     1046309 A *  12/1953
(Continued)

OTHER PUBLICATIONS

Communication dated Feb. 1, 2022 from the Japanese Patent Office in counterpart application No. 2018-248856.
(Continued)

*Primary Examiner* — Jessica B Wong
(74) *Attorney, Agent, or Firm* — Sughrue Mion, PLLC; Richard C. Turner (57) ABSTRACT

A hunting and fishing gear includes a haft (1), a harpoon body (2) extending in a longitudinal direction of the haft (1) from one end of the haft (1), and a plurality of harpoon tips (3) extending in a lateral direction Y from one side portion of the harpoon body (2) in a direction intersecting the longitudinal direction X of the harpoon body (2), and a barb (5) or a come-off prevention section (11; 12) provided to protrude into a space part (4) from at least one of the harpoon tips (3) located in the space part (4). Therefore, when a person grips a handle (7) with the person's hand (17) to use the hunting and fishing gear by swinging it in the direction of an arrow Z, the plurality of harpoon tips easily pierce a prey.

7 Claims, 5 Drawing Sheets (51) Int. Cl.
*A01M 27/00* (2006.01)
*A01M 31/00* (2006.01)

(56) References Cited

U.S. PATENT DOCUMENTS

| | | | | |
|---|---|---|---|---|
| 1,489,581 | A | * | 4/1924 | Lynch .................... A01K 97/14 294/100 |
| 1,709,298 | A | * | 4/1929 | Zoppa .................... A01K 97/14 43/42.7 |
| 1,818,474 | A | | 8/1931 | Gough |
| 2,603,521 | A | * | 7/1952 | Taylor .................... A01K 97/14 294/61 |
| 2,978,269 | A | | 4/1961 | Karlsson et al. |
| 3,095,662 | A | | 7/1963 | Puckett |
| 3,208,786 | A | | 9/1965 | Eddleman |
| 3,718,359 | A | | 2/1973 | Omdoll, Jr. |
| 3,766,678 | A | | 10/1973 | Reaves |
| 3,952,438 | A | | 4/1976 | Propst et al. |
| 3,978,605 | A | | 9/1976 | Maruniak |
| 4,024,665 | A | | 5/1977 | Payne |
| 9,307,754 | B1 | * | 4/2016 | Hill ........................ A01K 97/14 |
| 10,213,928 | B1 | * | 2/2019 | Smith .................... A01K 81/04 |
| 2004/0016170 | A1 | | 1/2004 | Fitzgibbons |
| 2006/0053676 | A1 | | 3/2006 | Mullen |
| 2006/0064916 | A1 | | 3/2006 | Shiflett |
| 2012/0085330 | A1 | | 4/2012 | Hickerson et al. |
| 2012/0204468 | A1 | | 4/2012 | Constantine |
| 2012/0246995 | A1 | * | 10/2012 | Moore, Jr. ............. A01K 81/04 43/6 |
| 2020/0187480 | A1 | | 6/2020 | Adams |

FOREIGN PATENT DOCUMENTS

| | | |
|---|---|---|
| FR | 1595479 A | 6/1970 |
| GB | 309683 A | 4/1929 |
| JP | 2003134962 A | 5/2003 |

OTHER PUBLICATIONS

Communication issued Jan. 21, 2022 from the Japanese Patent Office in counterpart application No. 2018-248856.

* cited by examiner

HUNTING AND FISHING HARPOON MACHETE

CROSS-REFERENCE TO RELATED APPLICATION

This application is a divisional of U.S. patent application Ser. No. 16/730,354, filed Dec. 30, 2019, in the U.S. Patent and Trademark Office, which application claims priority from Japanese Patent Application No. 2018-248856, filed Dec. 31, 2018, in the Japanese Patent Office, which is incorporated herein by reference in its entirety.

TECHNICAL FIELD

The present invention relates to a hunting and fishing gear as a tool having a shape of machete. The hunting and fishing gear includes a haft, a harpoon body extending in a longitudinal direction of the haft from one end portion of the haft, and a plurality of harpoon tips protruding in a lateral direction from one side portion of the harpoon body. The hunting and fishing gear is configured to capture aquatic organisms by wielding it from waterside into underwater around waterside plants or to capture land animals by swinging it down against the land animals.

BACKGROUND ART

A tool for capturing aquatic organisms by thrusting out in an axial direction of a haft, which is disclosed in Chinese Utility Model Publication No. 2015541605, has three or more harpoon tips at one end portion of a haft, thus the structure thereof is inappropriate for using by wielding the tool. Furthermore, when used for piercing in a longitudinal direction of the haft and if failed to capture a prey, the harpoon tips hit the river bottom resulting in loosing a sharpness of the harpoon tips, whereby the tool becomes unable be used again.

SUMMARY OF THE INVENTION

Problem to be Solved by the Invention

The present invention has been made in view of the drawback in above-described background art and aims at providing a hunting and fishing gear to be used by wielding. The hunting and fishing gear includes a plurality of harpoon tips which are protruded in a lateral direction from one side portion of a harpoon body and which are configured to easily pierce a prey.

Means for Solving the Problem

The present invention provides a hunting and fishing gear including: a haft; a harpoon body extending in a longitudinal direction of the haft from one end portion of the haft; and a plurality of harpoon tips protruding in a lateral direction from one side portion of the harpoon body, in which the plurality of harpoon tips form a first space part and a second space part adjacent to the first space part, a barb is provided in the first space part in a shape protruding toward the first space part from at least one of the plurality of harpoon tips located in the first space part, and a come-off prevention section is provided in the second space part in a shape protruding toward the second space part from at least one of the plurality of harpoon tips located in the second space part.

Effect of the Invention

The present invention can achieve, by configuring the hunting and fishing gear to include the haft, the harpoon body extending in the longitudinal direction of the haft from one end portion of the haft and the plurality of harpoon tips protruding in the lateral direction from one side portion of the harpoon body, an advantageous effect that, when the hunting and fishing gear is wielded, the plurality of harpoon tips easily pierce the prey.

EMBODIMENTS FOR CARRYING OUT THE INVENTION

Figure 1:
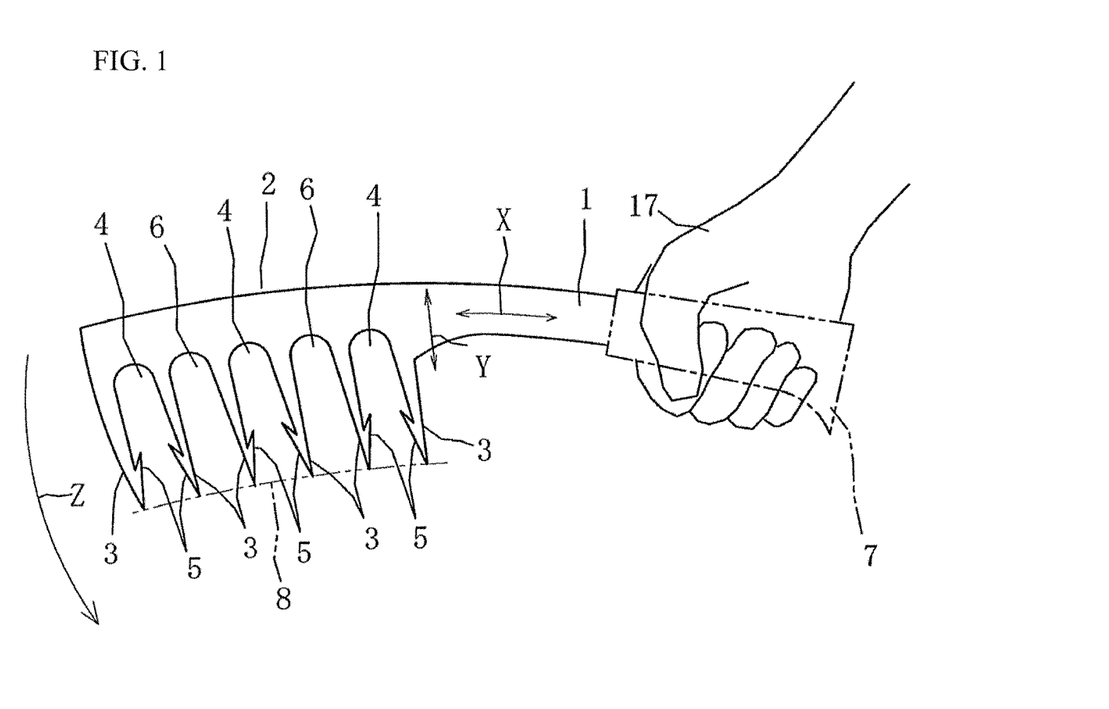
FIG. 1 is a front view illustrating a hunting and fishing gear according to Embodiment 1 for carrying out the invention.

A hunting and fishing gear illustrated in FIG. 1 includes a haft 1, a harpoon body 2, and a plurality of harpoon tips 3. The haft 1 is a platy member in which a longitudinal direction X exists in a direction from one end portion to the other end portion of the haft 1. The harpoon body 2 is a platy member extending in the longitudinal direction X of the haft 1 from one end portion of the haft 1, in which the longitudinal direction X exists in a direction from one end portion to the other end portion of the harpoon body 2. The plurality of harpoon tips 3 are platy members protruding in a lateral direction Y from one side portion of the harpoon body 2 in a direction intersecting the longitudinal direction X. Each of the harpoon tips 3 is located on one imaginary line 8 parallel to the longitudinal direction X of the harpoon body 2. The hunting and fishing gear is used by holding a handle 7 with a person's hand 17 to swing it down in a direction of an arrow Z, thus it is easier to handle compared to a conventional harpoon which is used to pierce in the longitudinal direction of the haft, and also the harpoon tips are hard to be damaged.

The number of the harpoon tips 3 is not limited to six, however, in the exemplified aspect, the number of the harpoon tips 3 is six, a first space part 4 and a second space part 6 are provided as space parts, and the first space part 4 and the second portion 6 are alternately adjacent to each other in the longitudinal direction X of the harpoon body 2.

The hunting and fishing gear may have a shape in which a barb 5 is not provided in the first space part 4. Even in this case, it is possible to pierce a prey with the plurality of harpoon tips 3 by utilizing the centrifugal force generated when a person grips a handle 7 of the hunting and fishing gear with a person's hand 17 and swings it down in a direction of the arrow Z. Further, the barb 5 may be provided in a shape protruding from at least one of the harpoon tips 3 in the first space part 4 toward the first space part 4 side. However, in the exemplified aspect, the barbs 5 are provided in the shape protruding toward the first space part 4 side from a pair of harpoon tips 3 in the first space part 4. It is to be noted that, in the case where the barbs 5 are provided on the pair of harpoon tips 3 in the first space part 4, it becomes difficult for the prey to escape and thus the prey is easily captured, compared to the case where the barbs 5 are provided on at least one of the harpoon tips 3 in the first space part 4. In the exemplified aspect, the barbs and come-off prevention sections are not provided in the second space part 6.

As described above, the hunting and fishing gear illustrated in FIG. 1 is configured to include the haft 1, the harpoon body 2 extending in the longitudinal direction X of the haft 1 from on end portion of the haft 1, the plurality of harpoon tips 3 protruding in the lateral direction Y from one end portion in the direction intersecting the longitudinal direction X of the harpoon body 2, and the barb 5 provided so as to protrude into the first space part 4 from at least one of the harpoon tips 3 in the first space part 4. Accordingly, it is possible to make the hunting and fishing gear from a metal plate such as an iron plate or a stainless steel plate by press processing. In addition, a handle 7 indicated by an imaginary line may be externally attached to the haft 1 of the hunting and fishing gear made of a metal plate such as an iron plate or a stainless steel plate by the press processing so that it can be easily gripped by hand. Incidentally, the hunting and fishing gear may be made by cutting out from a metal plate by laser processing, or by casting, however, it is easier to make the hunting and fishing gear by the press processing or laser processing than by casting.

Also, an attachment structure of the handle 7 may be provided on the haft 1 so that the handle 7 can be attached and detached. A rod may be attached to the haft 1 to make the hunting and fishing gear to be a spear or a scythe.

Figure 2:
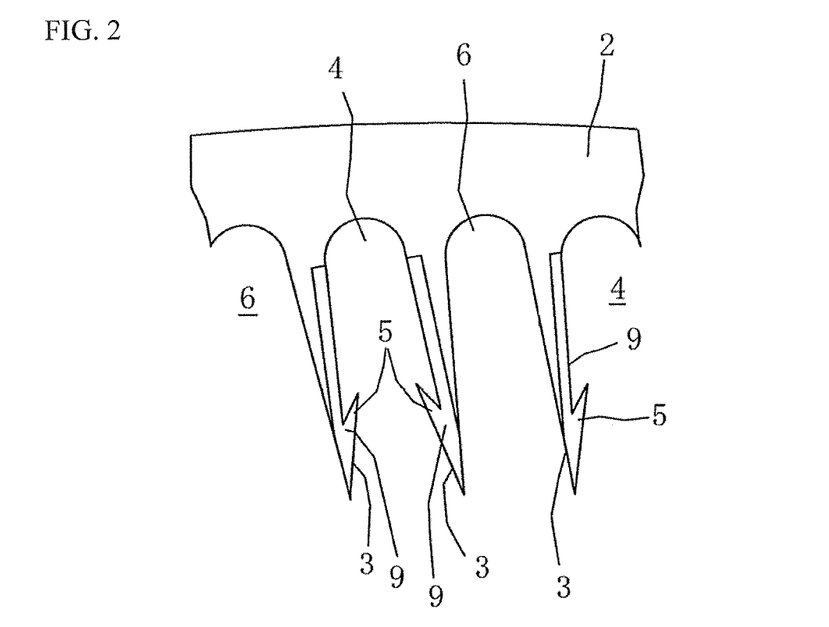
FIG. 2 is a front view illustrating a main part of FIG. 1.

As illustrated in FIG. 2, blades 9 are formed on the pair of harpoon tips 3 and the barbs 5 in the first space part 4. That is, the plate members of the pair of harpoon tips 3 and the barbs 5 in the first space part 4 are grinded so that the plate thicknesses thereof become gradually thinner toward the pair of harpoon tips 3 side and the barb 5 side. By being grinded in this way, the blades 9 are formed on the pair of harpoon tips 3 and the barbs 5 in the first space part 4. In other words, the blades 9 are provided on the pair of harpoon tips 3 so as to face with each other in the first space part 4. Since the blades 9 are formed on the pair of harpoon tips 3 and the barbs 5 in the first space part 4 in this way, the hunting and fishing gear achieves an advantageous effect that the pair of harpoon tips 3 and the barbs 5 in the first space part 4 easily pierce the prey.

Further, no blades are formed on the pair of harpoon tips 3 in the second space part 6, and also no blades are formed on the harpoon body 2 in the second space part 6 and on the harpoon body 2 in the first space part 4. That is, the pair of harpoon tips 3 in the second space part 6 are kept intact in terms of the plate thickness thereof and are not formed to be the blades. Because the pair of harpoon tips 3 in the second space part 6 are not provided with blades in a manner as to face with each other, there is an advantageous effect that the prey pierced by the harpoon tips 3 is difficult to come off and even if the prey struggles, it is difficult for the prey to escape.

Moreover, the harpoon body 2 in the second space part 6 and the harpoon body 2 in the first space part 4 are kept intact in terms of the plate thickness thereof and are not formed to be the blades. As such, because the pair of harpoon tips 3 in the second space part 6, the harpoon body 2 in the second space part 6 and the harpoon body 2 in the first space part 4 are not provided with the blades, it is possible to prevent the prey from being cut by the portions that are not provided with the blades.

Incidentally, the hunting and fishing gear may be configured such that the blades 9 are not formed on the pair of harpoon tips 3 and the barbs 5 in the first space part 4, on the other hand, blades similar to the blade 9 are formed on the pair of harpoon tips 3 in the second space part 6. Even in such a case, similar advantageous effects as those described in the paragraphs immediately above are achieved.

In the meantime, the hunting and fishing gear may be configured such that the blades 9 are formed on the pair of harpoon tips 3 and the barbs 5 in the first space part 4, and blades similar to the blade 9 are formed on the pair of harpoon tips 3 in the second space part 6. In this case, there is an advantageous effect that the harpoon tips 3 easily pierce the prey and the prey is easily removed from the harpoon tips 3. However, when the prey pierced by the harpoon tips 3 struggles, the blades 9 and the blades similar to the blade 9 of the harpoon tips 3 cut out the pierced portion of the prey, hence it becomes easy for the prey to escape.

Figure 3:
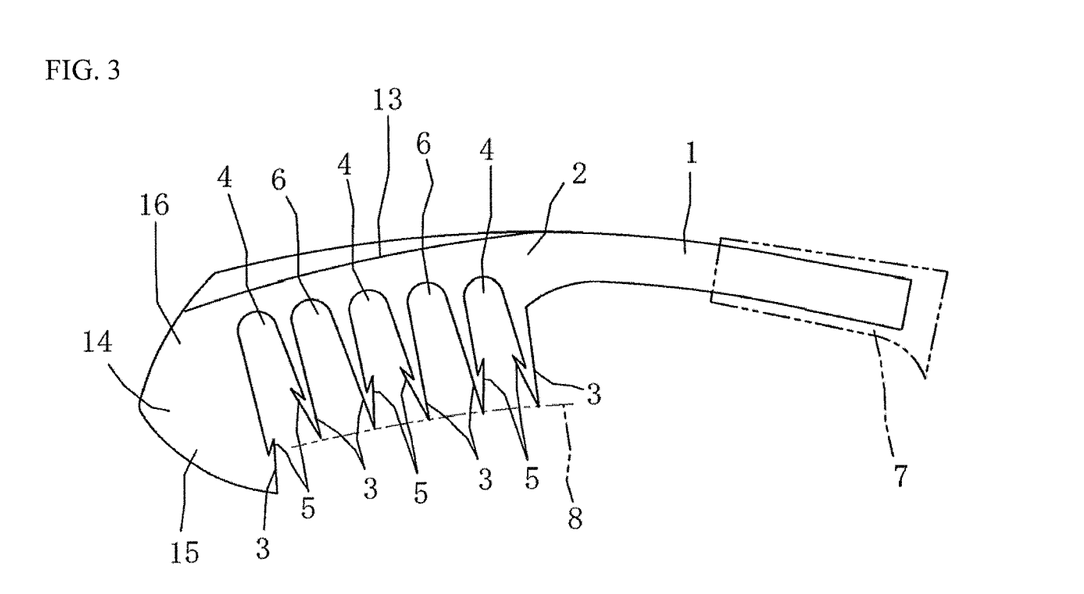
FIG. 3 is a front view illustrating a hunting and fishing gear according to Embodiment 2 for carrying out the invention.

In a hunting and fishing gear illustrated in FIG. 3, since the forefront harpoon tip 3 protrudes in the lateral direction over the other harpoon tips 3 positioned on one imaginary line 8, the forefront harpoon tip 3 can protect the other tips 3 from hitting rocks or the ground to thereby protect the other tips 3 from being damaged. In a case where the forefront harpoon tip 3 hits rocks or the ground and the sharpness thereof is deteriorated, it is sufficient to grind only the forefront harpoon tip 3. In the meantime, although a blade 13 does not need to be provided on the back side of the harpoon body 2, FIG. 3 exemplifies a case where the blade 13 is provided. A harpoon tip side protection section 15 and a back side protection section 16 are provided at an distal end portion 14 of the harpoon body 2. The harpoon tip side protection section 15 is provided as an inclined portion inclining from the harpoon tip 3 toward the distal end of the hunting and fishing gear so as to ease an impact even if the harpoon tip 3 hits the ground when the harpoon tip 3 side of the hunting and fishing gear is swung down. The back side protection section 16 is provided as an inclined portion inclining from the blade 13 toward the distal end of the hunting and fishing gear so as to ease the impact even if the blade 13 hits the ground when the back side of harpoon body 2 of the hunting and fishing gear is swung down.

Figure 4:
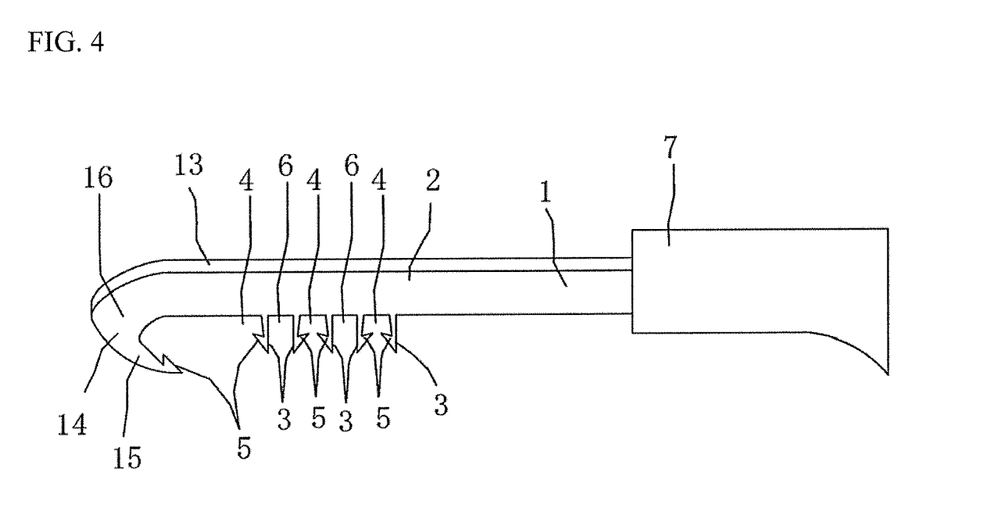
FIG. 4 is a front view illustrating a hunting and fishing gear according to Embodiment 2 for carrying out the invention.

In addition, as illustrated in FIG. 4, if the tip of the forefront harpoon tip 3 is provided to face the handle 7 side and the forefront harpoon tip 3 is protruded in the lateral direction over the other harpoon tips 3, when the hunting and fishing gear is put back into a sheath, the harpoon tips 3 are not caught and the storage becomes easy. Furthermore, since the tip of the forefront harpoon tip 3 is provided so as to face the handle 7 side, it is possible to move the captured prey by hooking it on the tip of the hunting and fishing gear.

The blade 9 illustrated in FIG. 2 may be provided in the hunting and fishing gears illustrated in FIGS. 3 and 4. In such a case, there is an advantageous effect that the pair of tips 3 and the barbs 5 in the first space part 4 easily pierce the prey. Further, since the pair of harpoon tips 3 in the second space part 6 are not provided with blades in a manner as to face with each other, there is an advantageous effect that it is difficult for the prey pierced by the harpoon tips 3 to come off and even if the prey struggles, it is difficult for the prey to escape. Furthermore, since no blades are formed on the pair of harpoon tips 3 in the second space part 6, the harpoon body 2 in the second space part 6 and the harpoon body 2 in the first space part 4, it is possible to prevent the prey from being cut by the portions that are not provided with the blades.

Incidentally, the hunting and fishing gear may be configured such that the blades 9 are not formed on the pair of harpoon tips 3 and the barbs 5 in the first space part 4, on the other hand, blades similar to the blade 9 are formed on the pair of harpoon tips 3 in the second space part 6. Even in such a case, a similar advantageous effect as that described in the paragraph immediately above is achieved.

Further, the hunting and fishing gear may be configured such that the blades 9 are formed on the pair of harpoon tips 3 and the barbs 5 in the first space part 4, and blades similar to the blade 9 are formed on the pair of harpoon tips 3 in the second space part 6. In this case, there is an advantageous effect that the harpoon tips 3 easily pierce the prey and the prey is easily removed from the harpoon tip 3. However, when the prey pierced by the harpoon tips 3 struggles, the blades 9 and the blades similar to the blade 9 of the harpoon tips 3 cut out the pierced portion of the prey, hence it becomes easy for the prey to escape.

Figure 5:
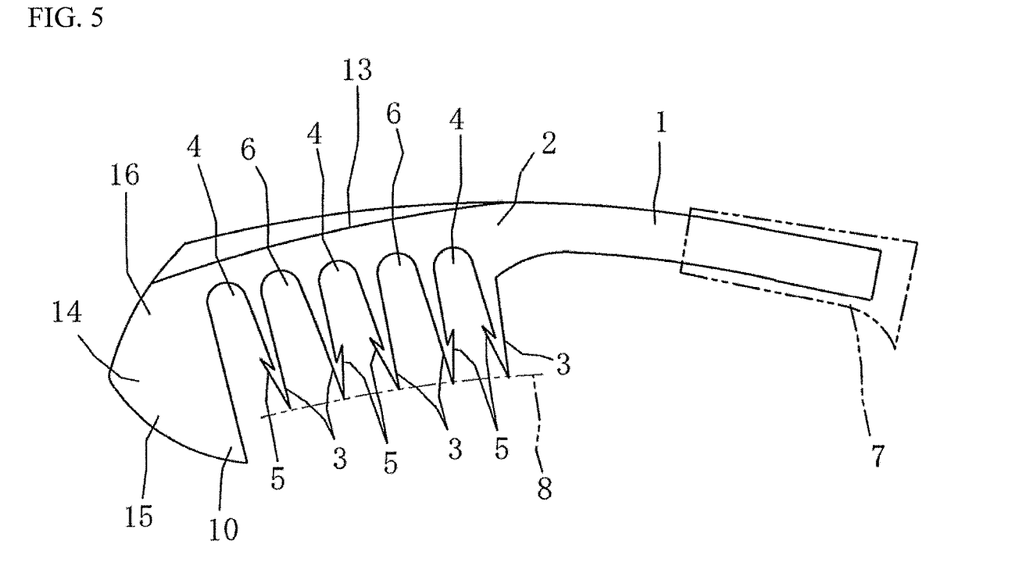
FIG. 5 is a front view illustrating a hunting and fishing gear according to Embodiment 3 for carrying out the invention.

In the hunting and fishing gear illustrated in FIG. 5, the forefront portion protruding in the lateral direction over the other harpoon tips 3 is made to be a protection section 10 as a protrusion not being the harpoon tip 3 and not being provided with the barb. Therefore, the protection section 10 can protect the other harpoon tips 3 from hitting rocks or the ground to thereby protect the other tips 3 from being damaged. Further, when the hunting and fishing gear is put back into the sheath, the harpoon tips 3 are not caught hence the storage becomes easy.

The blade 9 illustrated in FIG. 2 may be provided in the hunting and fishing gear illustrated in FIG. 5. In such a case, there is an advantageous effect that the pair of harpoon tips 3 and the barbs 5 in the first space part 4 easily pierce the prey. Further, since the pair of harpoon tips 3 in the second space part 6 are not provided with blades in a manner as to face with each other, there is an advantageous effect that it is difficult for the prey pierced by the harpoon tips 3 to come off and even if the prey struggles, it is difficult for the prey to escape. Furthermore, since no blades are formed on the pair of harpoon tips 3 in the second space part 6, the harpoon body 2 in the second space part 6 and the harpoon body 2 in the first space part 4, it is possible to prevent the prey from being cut by the portions that are not provided with the blades.

Incidentally, the hunting and fishing gear may be configured such that the blades 9 are not formed on the pair of harpoon tips 3 and the barbs 5 in the first space part 4, on the other hand, blades similar to the blade 9 are formed on the pair of harpoon tips 3 in the second space part 6. Even in such a case, a similar advantageous effect as that described in the paragraphs immediately above is achieved.

Further, the hunting and fishing gear may be configured such that the blades 9 are formed on the pair of harpoon tips 3 and the barbs 5 in the first space part 4, and blades similar to the blade 9 are formed on the pair of harpoon tips 3 in the second space part 6. In this case, there is an advantageous effect that the harpoon tips 3 easily pierce the prey and the prey is easily removed from the harpoon tips 3. However, when the prey pierced by the harpoon tips 3 struggles, the blades 9 and the blades similar to the blade 9 of the harpoon tips 3 cut out the pierced portion of the prey, hence it becomes easy for the prey to escape.

Figure 6:
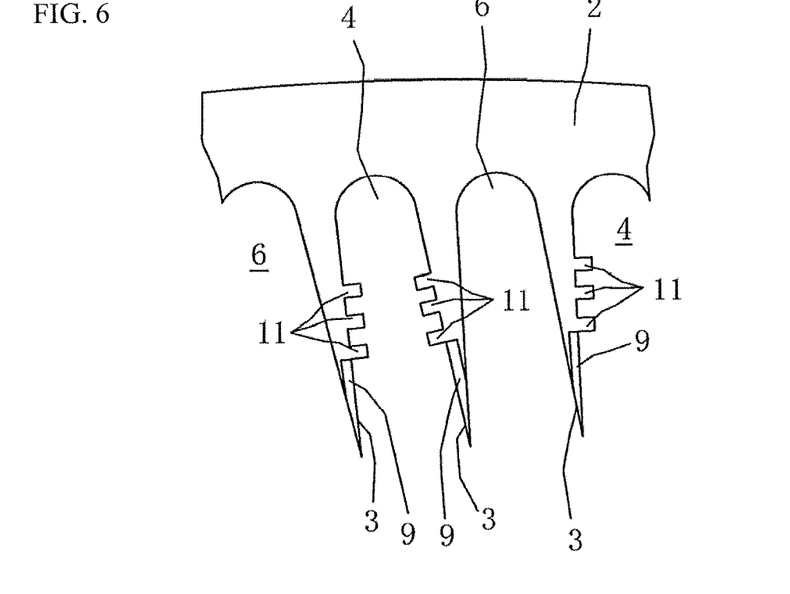
FIG. 6 is a front view illustrating a hunting and fishing gear according to Embodiment 4 for carrying out the invention.

In a hunting and fishing gear illustrated in FIG. 6, in the first space part 4 as a side where the pair of harpoon tips 3 among the three or more harpoon tips 3 face with each other, come-off prevention sections 11 are provided in the convex and concave shape from the mutually facing pair of harpoon tips 3 toward the first space part 4 side. The come-off prevention portion 11 illustrated in FIG. 6 corresponds to the barb 5 illustrated in FIGS. 1 to 4, and has the convex and concave shape so that the harpoon tips 3 do not come out of the prey pierced by the harpoon tips 3. FIG. 6 exemplifies an aspect in which the blades 9 are provided on the harpoon tips 3 positioned ahead of the come-off prevention sections 11. In such a case, there is an advantageous effect that the pair of harpoon tips 3 in the first space part 4 easily pierce the prey.

Further, no blades are formed on the pair of harpoon tips 3 in the second space part 6, and also no blades are formed on the harpoon body 2 in the second space part 6 and on the harpoon body 2 in the first space part 4. That is, the pair of harpoon tips 3 in the second space part 6 are kept intact in terms of the plate thickness thereof and are not formed to be the blades. Because the pair of harpoon tips 3 in the second space part 6 are not provided with blades in a manner as to face with each other, there is an advantageous effect that the prey pierced by the harpoon tips 3 is difficult to come off and even if the prey struggles, it is difficult for the prey to escape.

Moreover, the harpoon body 2 in the second space part 6 and the harpoon body 2 in the first space part 4 are kept intact in terms of the plate thickness thereof and are not formed to be the blades. As such, because the pair of harpoon tips 3 in the second space part 6, the harpoon body 2 in the second space part 6 and the harpoon body 2 in the first space part 4 are not formed to be the blades, it is possible to prevent the prey from being cut by the portions that are not formed to be the blades.

Incidentally, the hunting and fishing gear may be configured such that the blades 9 are not formed on the pair of harpoon tips 3 positioned ahead of the come-off prevention sections 11, on the other hand, blades similar to the blade 9 are formed on the pair of harpoon tips 3 in the second space part 6. Even in such a case, similar advantageous effects as those described in the paragraphs immediately above are achieved.

Further, the hunting and fishing gear may be configured such that the blades 9 are formed on the pair of harpoon tips 3 positioned ahead of the come-off prevention sections 11, and blades similar to the blade 9 are formed on the pair of harpoon tips 3 in the second space part 6. In this case, there is an advantageous effect that the harpoon tips 3 easily pierce the prey and the prey is easily removed from the harpoon tips 3. However, when the prey pierced by the harpoon tips 3 struggles, the blades 9 and the blades similar to the blade 9 of the harpoon tips 3 cut out the pierced portion of the prey, hence it becomes easy for the prey to escape.

Also in the hunting and fishing gear illustrated in FIG. 6, the forefront harpoon tip 3 illustrated in FIG. 3 or the protection section 10 illustrated in FIG. 5 may be provided.

Figure 7:
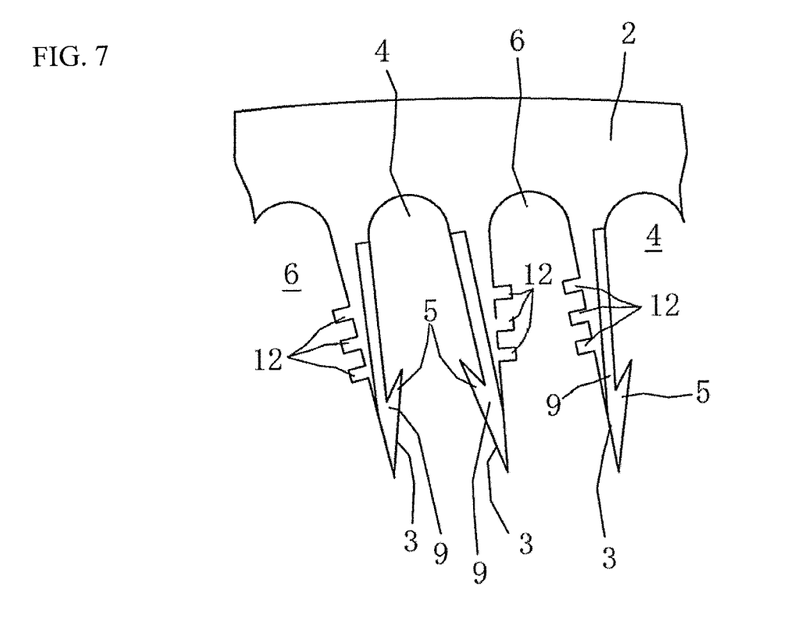
FIG. 7 is a front view illustrating a hunting and fishing gear according to Embodiment 5 for carrying out the invention.
Figure 8A:
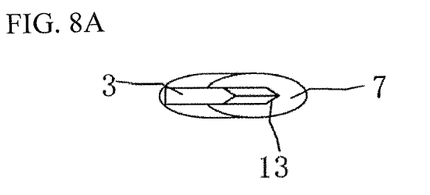
FIG. 8A is a plan view illustrating a hunting and fishing gear according to Embodiment 6 for carrying out the invention.
Figures 8B, 8C, 8D:
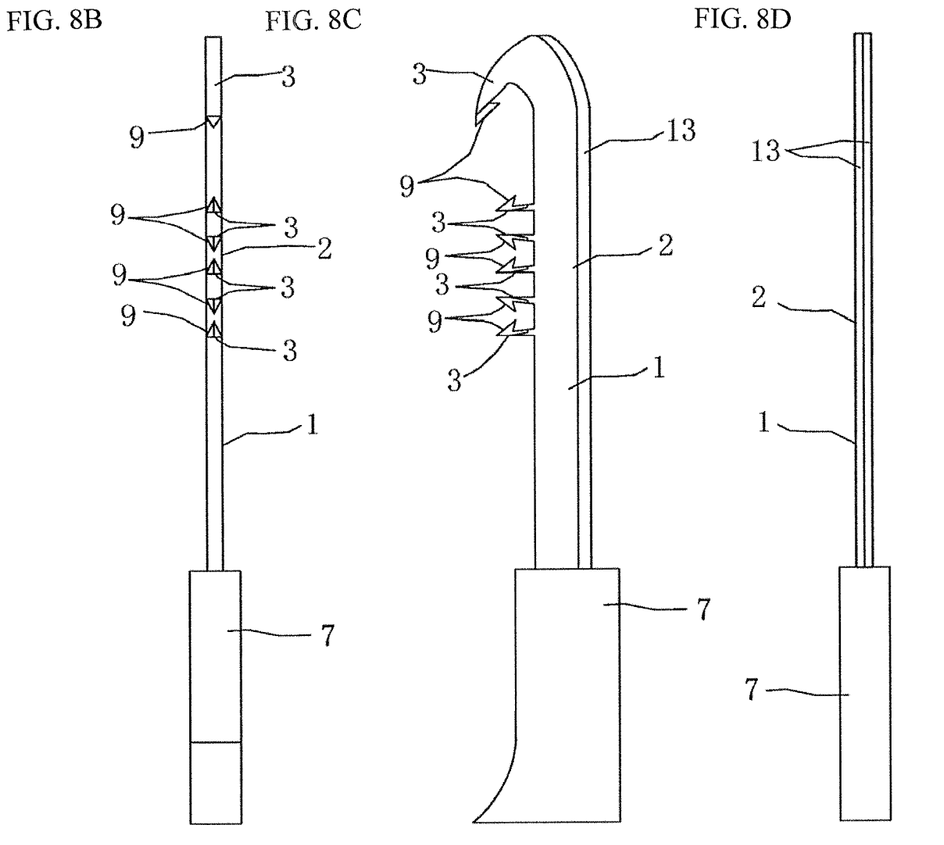
FIG. 8B is a left side view illustrating the hunting and fishing gear according to Embodiment 6 for carrying out the invention.
FIG. 8C is a front view illustrating the hunting and fishing gear according to Embodiment 6 for carrying out the invention.
FIG. 8D is a right side view illustrating the hunting and fishing gear according to Embodiment 6 for carrying out the invention.
Figure 8E:
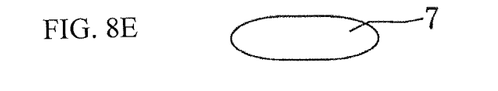
FIG. 8E is a bottom view illustrating the hunting and fishing gear according to Embodiment 6 for carrying out the invention.

In a hunting and fishing gear illustrated in FIG. 7, in the first space part 4 as a side where the pair of harpoon tips 3 among the three or more harpoon tips 3 face with each other, barbs 5 are provided in the shape protruding from the mutually facing pair of harpoon tips 3 toward the first space part 4 side. The come-off prevention sections 12 are provided in the second space part 6 adjacent to the first space part 4, in the shape of convex and concave from mutually facing pair of harpoon tips 3 toward the second space part 6 side. FIG. 7 illustrates a case where the blades 9 are formed on the pair of harpoon tips 3 and the barbs 5 in the first space part 4. In such a case, there is an advantageous effect that the pair of harpoon tips 3 and the barbs 5 in the first space part 4 easily pierce the prey.

Furthermore, no blades are formed on the pair of harpoon tips 3 in the second space part 6, and also no blades are formed on the harpoon body 2 in the second space part 6 and on the harpoon body 2 in the first space part 4. That is, the pair of harpoon tips 3 in the second space part 6 are kept intact in terms of the plate thickness thereof and are not formed to be the blades. Because the pair of harpoon tips 3 in the second space part 6 are not provided with blades in a manner as to face with each other, there is an advantageous effect that the prey pierced by the harpoon tips 3 is difficult to come off and even if the prey struggles, it is difficult for the prey to escape.

Moreover, the harpoon body 2 in the second space part 6 and the harpoon body 2 in the first space part 4 are kept intact in terms of the plate thickness thereof and are not formed to be the blades. As such, because the pair of harpoon tips 3 in the second space part 6, the harpoon body 2 in the second space part 6 and the harpoon body 2 in the first space part 4 are not provided with blades, it is possible to prevent the prey from being cut by the portions that are not provided with the blades.

Incidentally, in FIG. 7, the blades 9 may not be formed on the pair of harpoon tips 3 and the barbs 5 in the first space part 4, on the other hand, blades similar to the blade 9 may be formed on the harpoon tips 3 positioned ahead of the come-off prevention sections 12. Even in such a case, similar advantageous effects as those described in the paragraphs immediately above are achieved.

Further, the blades 9 may be formed on the pair of harpoon tips 3 and the barbs 5 in the first space part 4, and blades similar to the blade 9 may be formed on the harpoon tips 3 positioned ahead of the pair of come-off prevention sections 12 in the second space part 6. In this case, there is an advantageous effect that the harpoon tips 3 easily pierce the prey and the prey is easily removed from the harpoon tips 3. However, when the prey pierced by the harpoon tips 3 struggles, the blades 9 and the blades similar to the blade 9 of the harpoon tips 3 cut out the pierced portion of the prey, hence it becomes easy for the prey to escape.

Also in the hunting and fishing gear illustrated in FIG. 7, the forefront harpoon tip 3, the blade 13, the harpoon tip side protection section 15 and the back side protection section 16 illustrated in FIG. 3 or the protection section 10 illustrated in FIG. 5 may be provided.

Embodiment 6 for carrying out the invention is illustrated in FIGS. 8A to 8E. This embodiment is different from the embodiment illustrated in FIG. 4 in that each of the harpoon tips 3 of the hunting and fishing gear is provided with the blade 9. FIGS. 8A to 8E are each a plan view, a left side view, a front view, a right side view, and a bottom view of Embodiment 6 for carrying out the invention. Meantime, since the front view and the rear view are symmetrical, the rear view is omitted. FIGS. 8A to 8E are illustrated with solid lines, but these figures include a design created as a partial design.

Embodiments 1 to 3 for carrying out the invention and Embodiments 5 and 6 for carrying out the invention exemplify the cases where each of the pair of harpoon tips 3 is provided with one barb 5. However, the pair of harpoon tips 3 may be provided with a plurality of barbs 5 in such a manner as to be arranged in line in the lateral direction Y on the first space part 4 side. Incidentally, the number of barbs 5 of one harpoon tip 3 of the pair of harpoon tips 3 and the number of barbs 5 of the other harpoon tip 3 of the pair of harpoon tips 3 may be the same or may be different from each other.

The foregoing description of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications are suited to the particular use contemplated. It is intended that the scope of the invention be defined by the following claims and their equivalents.

EXPLANATION OF REFERENCE SIGNS 1 haft
2 harpoon body
3 harpoon tip
4 first space part
5 barb
6 second space part
7 handle
8 imaginary line
9 blade
10 protection section
11 come-off prevention section
12 come-off prevention section
13 blade
14 distal end
15 harpoon tip side protection section
16 back side protection section
X longitudinal direction of haft 1 and harpoon body 2
Y lateral direction intersecting the longitudinal direction
Z wielding direction

What is claimed is:

1. A hunting and fishing gear comprising: a haft extending in a longitudinal direction; a harpoon body extending further in said longitudinal direction from one end of the haft; said harpoon body having a plurality of harpoon tips extending therefrom in a lateral direction and spaced apart from one another in said longitudinal direction; said harpoon tips having a length such that ends of the plurality of said harpoon tips together define an imaginary line parallel to said longitudinal direction; wherein, in sequential order along said harpoon body starting from said one end of said haft: (a) a first harpoon tip and a second harpoon tip protrude in said lateral direction and enclose a first space together with a first portion of the harpoon body between said first and second harpoon tips, and a first portion of said imaginary line between said first and second harpoon tips; wherein said first harpoon tip includes a first barb protruding into said first space in a direction toward said second harpoon tip, and wherein said second harpoon tip includes a second barb protruding into said first space in a direction toward said first harpoon tip; (b) said second harpoon tip and a third harpoon tip protrude in said lateral direction and enclose a second space together with a second portion of the harpoon body between said second and third harpoon tips, and a second portion of said imaginary line between said second and third harpoon tips; and said second space being devoid of barbs; (c) said third harpoon tip and a fourth harpoon tip protrude in said lateral direction and enclose a third space together with a third portion of the harpoon body between said third and fourth harpoon tips, and a third portion of said imaginary line between said third and fourth harpoon tips; wherein said third harpoon tip includes a third barb protruding into said third space in a direction toward said fourth harpoon tip, and wherein said fourth harpoon tip includes a fourth barb protruding into said third space in a direction toward said third harpoon tip; and (d) one or more additional harpoon tips, defining one or more additional spaces.

2. The hunting and fishing gear according to claim 1, wherein at least one of said second harpoon tip and said third harpoon tip includes a first disconnection prevention section of concave-convex shape protruding into said second space.

3. The hunting and fishing gear according to claim 1, wherein said second harpoon tip includes a first disconnection prevention section of concave-convex shape protruding into said second space in a direction toward said third harpoon tip, and wherein said third harpoon tip includes a second disconnection prevention section of concave-convex shape protruding into said second space in a direction toward said second harpoon tip.

4. A hunting and fishing gear comprising: a haft extending in a longitudinal direction; a harpoon body extending further in said longitudinal direction from one end of the haft; said harpoon body having a plurality of harpoon tips extending therefrom in a lateral direction and spaced apart from one another in said longitudinal direction; said harpoon tips having a length such that ends of the plurality of said harpoon tips together define an imaginary line parallel to said longitudinal direction; wherein, in sequential order along said harpoon body starting from said one end of said haft: (a) a first harpoon tip and a second harpoon tip protrude in said lateral direction and enclose a first space together with a first portion of the harpoon body between said first and second harpoon tips, and a first portion of said imaginary line between said first and second harpoon tips; wherein at least one of said first harpoon tip and said second harpoon tip includes a first barb protruding into said first space in a direction toward the other of the first harpoon tip and the second harpoon tip; (b) said second harpoon tip and a third harpoon tip protrude in said lateral direction and enclose a second space together with a second portion of the harpoon body between said second and third harpoon tips, and a second portion of said imaginary line between said second and third harpoon tips; and said second space being devoid of barbs; (c) said third harpoon tip and a fourth harpoon tip protrude in said lateral direction and enclose a third space together with a third portion of the harpoon body between said third and fourth harpoon tips, and a third portion of said imaginary line between said third and fourth harpoon tips; wherein at least one of said third harpoon tip and said fourth harpoon tip includes a further barb protruding into said third space in a direction toward the other of the third harpoon tip and the fourth harpoon tip, and (d) one or more additional harpoon tips, defining one or more additional spaces.

5. A hunting and fishing gear comprising: a haft extending in a longitudinal direction; a harpoon body extending further in said longitudinal direction from one end of the haft; said harpoon body having a plurality of harpoon tips extending therefrom in a lateral direction and spaced apart from one another in said longitudinal direction; said harpoon tips having a length such that ends of the plurality of said harpoon tips together define an imaginary line parallel to said longitudinal direction; wherein, in sequential order along said harpoon body: (a) a first harpoon tip and a second harpoon tip protrude in said lateral direction and enclose a first space together with a first portion of the harpoon body between said first and second harpoon tips, and a first portion of said imaginary line between said first and second harpoon tips; wherein at least one of said first harpoon tip and said second harpoon tip includes a come-off prevention section having convex and concave shapes protruding into said first space in a direction toward the other of the first harpoon tip and the second harpoon tip; (b) said second harpoon tip and a third harpoon tip protrude in said lateral direction and enclose a second space together with a second portion of the harpoon body between said second and third harpoon tips, and a second portion of said imaginary line between said second and third harpoon tips; and said second space being devoid of come-off prevention sections; (c) said third harpoon tip and a fourth harpoon tip protrude in said lateral direction and enclose a third space together with a third portion of the harpoon body between said third and fourth harpoon tips, and a third portion of said imaginary line between said third and fourth harpoon tips; wherein at least one of said third harpoon tip and said fourth harpoon tip includes a second come-off prevention section of convex and concave shape protruding into said third space in a direction toward the other of the third harpoon tip and the fourth harpoon tip, and (d) one or more additional harpoon tips, defining one or more additional spaces.

6. The hunting and fishing gear of claim 4, wherein at least one of said second harpoon tip and said third harpoon tip includes a first disconnection prevention section of concave-convex shape protruding into said second space.

7. The hunting and fishing gear according to claim 4, wherein said second harpoon tip includes a first disconnection prevention section of concave-convex shape protruding into said second space in a direction toward said third harpoon tip, and wherein said third harpoon tip includes a second disconnection prevention section of concave-convex shape protruding into said second space in a direction toward said second harpoon tip.

* * * * *